(12) United States Patent
Fujita (10) Patent No.: US 9,926,844 B2
(45) Date of Patent: Mar. 27, 2018

(54) POWER GENERATION SYSTEM AND OPERATION METHOD OF POWER GENERATION SYSTEM

(71) Applicant: MITSUBISHI HITACHI POWER SYSTEMS, LTD., Kanagawa (JP)

(72) Inventor: Kazunori Fujita, Tokyo (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 419 days.

(21) Appl. No.: 14/430,738

(22) PCT Filed: Oct. 28, 2013

(86) PCT No.: PCT/JP2013/079161
§ 371 (c)(1),
(2) Date: Mar. 24, 2015

(87) PCT Pub. No.: WO2014/069414
PCT Pub. Date: May 8, 2014

(65) Prior Publication Data
US 2015/0260097 A1 Sep. 17, 2015

(30) Foreign Application Priority Data
Oct. 31, 2012 (JP) ................................ 2012-240997

(51) Int. Cl.
*F02C 6/04* (2006.01)
*F02C 3/20* (2006.01)
(Continued)

(52) U.S. Cl.
CPC .................. *F02C 3/20* (2013.01); *F01K 5/02* (2013.01); *F02C 3/04* (2013.01); *F02C 3/22* (2013.01);
(Continued)

(58) Field of Classification Search
USPC ....... 60/39.5, 39.12, 39.23, 39.27, 783, 784, 60/794
See application file for complete search history.

(56) References Cited

U.S. PATENT DOCUMENTS 6,607,854 B1 * 8/2003 Rehg ................. H01M 8/04089
429/413
7,255,956 B2 * 8/2007 McElroy ........... H01M 8/04022
429/486

(Continued)

FOREIGN PATENT DOCUMENTS

CN 102171878 8/2011
JP 9-35734 2/1997

(Continued)

OTHER PUBLICATIONS

Decision to Grant a Patent dated Dec. 6, 2016 in Japanese Application No. 2012-240997, with English translation.

(Continued)

*Primary Examiner* — Binh Q Tran
(74) *Attorney, Agent, or Firm* — Wenderoth, Lind & Ponack, L.L.P.

(57) ABSTRACT

A power generation system includes a gas turbine, a fuel cell, an exhausted fuel gas supply line, an on-off control valve arranged in the exhausted fuel gas supply line, a heating unit that heats the exhausted fuel gas supply line in a range on an upstream side of the on-off control valve, a detection unit that detects a state of exhausted fuel gas in the exhausted fuel gas supply line in the range on the upstream side of the on-off control valve, and a control unit which controls the heating of the exhausted fuel gas supply line by the heating unit and which sets the on-off control valve to open when determining that the heating of the exhausted fuel gas supply line is completed.

6 Claims, 4 Drawing Sheets

(51) Int. Cl.
*H01M 8/0662* (2016.01)
*H01M 8/04111* (2016.01)
*H01M 8/04701* (2016.01)
*F02C 3/04* (2006.01)
*F02C 7/224* (2006.01)
*H01M 8/0432* (2016.01)
*F02C 3/22* (2006.01)
*F02C 6/18* (2006.01)
*F01K 5/02* (2006.01)
*H01M 8/124* (2016.01)

(52) U.S. Cl.
CPC ............. *F02C 6/18* (2013.01); *F02C 7/224* (2013.01); *H01M 8/0432* (2013.01); *H01M 8/04111* (2013.01); *H01M 8/04716* (2013.01); *H01M 8/04738* (2013.01); *H01M 8/0662* (2013.01); *F05D 2210/12* (2013.01); *H01M 2008/1293* (2013.01); *Y02E 20/16* (2013.01)

(56) References Cited

U.S. PATENT DOCUMENTS

| | | | | |
|---|---|---|---|---|
| 7,595,124 | B2* | 9/2009 | Varatharajan | H01M 8/04111 429/415 |
| 7,972,736 | B2* | 7/2011 | Miyata | H01M 8/04022 429/430 |
| 9,482,159 | B2* | 11/2016 | Ozawa | F02C 9/40 |
| 9,638,102 | B2* | 5/2017 | Kobayashi | F02C 6/08 |

FOREIGN PATENT DOCUMENTS

| | | |
|---|---|---|
| JP | 2002-298889 | 10/2002 |
| JP | 2004-220941 | 8/2004 |
| JP | 2005-56790 | 3/2005 |
| JP | 2009-205930 | 9/2009 |

OTHER PUBLICATIONS

Notification of Grant of Invention Patent dated Dec. 26, 2016 in corresponding Chinese Application No. 201380050838.5 (with partial English Translation).

Korean Notice of Allowance dated Dec. 13, 2016 in corresponding Korean Application No. 10-2015-7008073 (with partial English translation).

International Preliminary Report on Patentability and Written Opinion of the International Searching Authority issued May 5, 2015 in International (PCT) Application No. PCT/JP2013/079161.

International Search Report dated Jan. 17, 2014 in International (PCT) Application No. PCT/JP2013/079161.

First Office Action dated Jul. 5, 2016 in corresponding Chinese Application No. 201380050838.5, with English translation.

\* cited by examiner

POWER GENERATION SYSTEM AND OPERATION METHOD OF POWER GENERATION SYSTEM

FIELD

The present invention relates to a power generation system in which a solid oxide fuel cell, a gas turbine, and a steam turbine are combined, and an operation method of the power generation system.

BACKGROUND

A solid oxide fuel cell (hereinafter referred to as SOFC) is known as a versatile and highly efficient fuel cell. An operating temperature of the SOFC is set to high in order to increase ionic conductivity, so that air discharged from a compressor of a gas turbine can be used as air (oxidant) supplied to a cathode side. Further, a high temperature fuel that cannot be used by the SOFC can be used as a fuel of a combustor of the gas turbine.

Therefore, for example, as described in Japanese Patent Application Publication No. 2009-205930, various combinations of SOFC, a gas turbine, and a steam turbine are proposed as a power generation system that can achieve highly efficient power generation. A combined system described in Japanese Patent Application Publication No. 2009-205930 includes an SOFC, a gas turbine combustor that combusts exhausted fuel gas and exhausted air which are exhausted from the SOFC, and a gas turbine including a compressor that compresses air and supplies the compressed air to the SOFC.

Technical Problem

In a conventional power generation system described above, the calories of the exhausted fuel gas supplied from the SOFC to the gas turbine may vary. In particular, in the power generation system, when the supply of the exhausted fuel gas from the SOFC to the gas turbine is started, the variation is easy to occur. When the calories of the exhausted fuel gas supplied to the gas turbine vary, there is a problem that the combustion in the combustor of the gas turbine becomes unstable.

SUMMARY

The present invention solves the problem described above, and an object of the present invention is to provide a power generation system and an operation method of a power generation system, which can more stabilize the exhausted fuel gas supplied from a fuel cell to the gas turbine and stabilize the combustion in the gas turbine.

Solution to Problem

According to an aspect of the present invention, a power generation system includes: a gas turbine including a compressor and a combustor; a fuel cell including a cathode and an anode; an exhausted fuel gas supply line that supplies exhausted fuel gas exhausted from the fuel cell to gas turbine; an on-off control valve which is arranged in the exhausted fuel gas supply line and which at least switches between open and close; a heating unit that heats the exhausted fuel gas supply line in a range on an upstream side of the on-off control valve; a detection unit that detects a state of the exhausted fuel gas in the exhausted fuel gas supply line in the range on the upstream side of the on-off control valve; and a control unit which controls the heating of the exhausted fuel gas supply line by the heating unit based on a result detected by the detection unit, and which operates the on-off control valve to open when determining that the heating of the exhausted fuel gas supply line is completed based on a result detected by the detection unit.

Therefore, by providing the heating means, the detection unit, and the on-off control valve, it is possible to heat the exhausted fuel gas supply line by the heating means and prevent the exhausted fuel gas from being supplied to the gas turbine until the state of the exhausted fuel gas flowing through the exhausted fuel gas supply line, which is detected by the detection unit, is stabilized to a predetermined state. Then, it is possible to heat the exhausted fuel gas supply line that supplies the exhausted fuel gas to the gas turbine, so that it is possible to prevent the exhausted fuel gas in which drain occurs from being directly supplied to the combustor of the gas turbine. Further, it is possible to prevent the exhausted fuel gas whose water content is reduced by generation of drain and whose calories are increased from being supplied to the gas turbine, and it is possible to prevent the exhausted fuel gas whose $H_2O$ content is increased by evaporation of the generated drain, that is, the exhausted fuel gas whose calories are low, from being supplied to the gas turbine. Thereby, it is possible to stabilize the characteristics of the exhausted fuel gas to be supplied to the gas turbine, so that it is possible to stabilize the combustion in the gas turbine.

Advantageously, in the power generation system, the detection unit is a calorimeter that detects calories of the exhausted fuel gas, and when the control device detects that the calories detected by the detection unit is within a predetermined range, the control device determines that the heating of the exhausted fuel gas supply line is completed.

Therefore, it is possible to supply the exhausted fuel gas with stable calories to the gas turbine, so that it is possible to stabilize the combustion in the gas turbine.

Advantageously, in the power generation system, the detection unit is a thermometer that detects a temperature of the exhausted fuel gas, and when the control device detects that the temperature detected by the detection unit is higher than or equal to a predetermined value, the control device determines that the heating of the exhausted fuel gas supply line is completed.

Therefore, it is possible to start supplying the exhausted fuel gas to the gas turbine after detecting that the exhausted fuel gas flowing through the exhausted fuel gas supply line flows at a temperature at which no drain occurs. Thereby, it is possible to supply the exhausted fuel gas with stable calories to the gas turbine, so that it is possible to stabilize the combustion in the gas turbine.

Advantageously, the power generation system further includes: a fuel gas supply line that supplies fuel gas to the fuel cell; and a fuel gas recirculation line that supplies a part the exhausted fuel gas flowing through the exhausted fuel gas supply line to the fuel gas supply line, one end of the fuel gas recirculation line being connected to the exhausted fuel gas supply line on the upstream side of the on-off control valve, the other end of the fuel gas recirculation line being connected to the fuel gas supply line. The heating unit includes an exhausted fuel gas recirculation line whose one end is connected to the exhausted fuel gas supply line on an downstream side of a connection position between the exhausted fuel gas supply line and the fuel gas recirculation line and on the upstream side of the on-off control valve and whose other end is connected to the fuel gas recirculation line, supplies the exhausted fuel gas flowing through the exhausted fuel gas supply line to the fuel gas recirculation line by the exhausted fuel gas recirculation line, circulates the exhausted fuel gas flowing through the exhausted fuel gas supply line, and heats the exhausted fuel gas supply line by heat of the exhausted fuel gas.

Therefore, it is possible to heat the exhausted fuel gas supply line by circulating the exhausted fuel gas. Thereby, it is not necessary to provide a separate heat source, and the exhausted fuel gas used for heating can be effectively used.

According to another aspect of the present invention, an operation method of a power generation system including a gas turbine including a compressor and a combustor, a fuel cell including a cathode and an anode, an exhausted fuel gas supply line that supplies exhausted fuel gas exhausted from the fuel cell to gas turbine, and an on-off control valve which is arranged in the exhausted fuel gas supply line and which at least switches between open and close, includes: a step of detecting a state of the exhausted fuel gas in the exhausted fuel gas supply line in a range on an upstream side of the on-off control valve; a step of heating the exhausted fuel gas supply line based on a result detected by the detection unit; and a step of setting the on-off control valve to open when determining that a state of the exhausted fuel gas flowing through the exhausted fuel gas supply line is stabilized based on a result detected by the detection unit.

Therefore, it is possible to heat the exhausted fuel gas supply line and prevent the exhausted fuel gas from being supplied to the gas turbine until the detected state of the exhausted fuel gas flowing through the exhausted fuel gas supply line is stabilized to a predetermined state. Then, it is possible to heat the exhausted fuel gas supply line that supplies the exhausted fuel gas to the gas turbine, so that it is possible to prevent the exhausted fuel gas in which drain occurs from being directly supplied to the combustor of the gas turbine. Further, it is possible to prevent the exhausted fuel gas whose water content is reduced by generation of drain and whose calories are increased from being supplied to the gas turbine, and it is possible to prevent the exhausted fuel gas whose $H_2O$ content is increased by evaporation of the generated drain, that is, the exhausted fuel gas whose calories are low, from being supplied to the gas turbine. Thereby, it is possible to stabilize the calories of the exhausted fuel gas to be supplied to the gas turbine, so that it is possible to stabilize the combustion in the gas turbine.

Advantageous Effects of Invention

According to the power generation system and the operation method of a power generation system of the present invention, it is possible to heat the exhausted fuel gas supply line that supplies the exhausted fuel gas to the gas turbine, so that it is possible to prevent the exhausted fuel gas in which drain occurs from being directly supplied to the combustor of the gas turbine. Further, it is possible to prevent the exhausted fuel gas whose water content is reduced by generation of drain and whose calories are increased from being supplied to the gas turbine, and it is possible to prevent the exhausted fuel gas whose $H_2O$ content is increased by evaporation of the generated drain, that is, the exhausted fuel gas whose calories are low, from being supplied to the gas turbine. Thereby, it is possible to stabilize the calories of the exhausted fuel gas to be supplied to the gas turbine, so that it is possible to stabilize the combustion in the gas turbine.

DESCRIPTION OF EMBODIMENT

Hereinafter, a preferred embodiment of a power generation system and a starting method of a solid oxide fuel cell in the power generation system according to the present invention will be described in detail with reference to the drawings. The present invention is not limited by the embodiment, and if there is a plurality of embodiments, the present invention includes any combination of some or all of the embodiments.

Embodiment

A power generation system of the embodiment is a Triple Combined Cycle (registered trademark) in which a solid oxide fuel cell (hereinafter referred to as SOFC), a gas turbine, and a steam turbine are combined. The Triple Combined Cycle can realize very high power generation efficiency because the triple combined cycle can take out electricity in three stages including SOFC, a gas turbine, and a steam turbine by providing the SOFC on the upstream side of a gas turbine combined cycle power generation (GTCC). In the description below, a solid oxide fuel cell is applied as a fuel cell of the present invention. However, the fuel cell of the present invention is not limited to this type of fuel cell.

Figure 1:
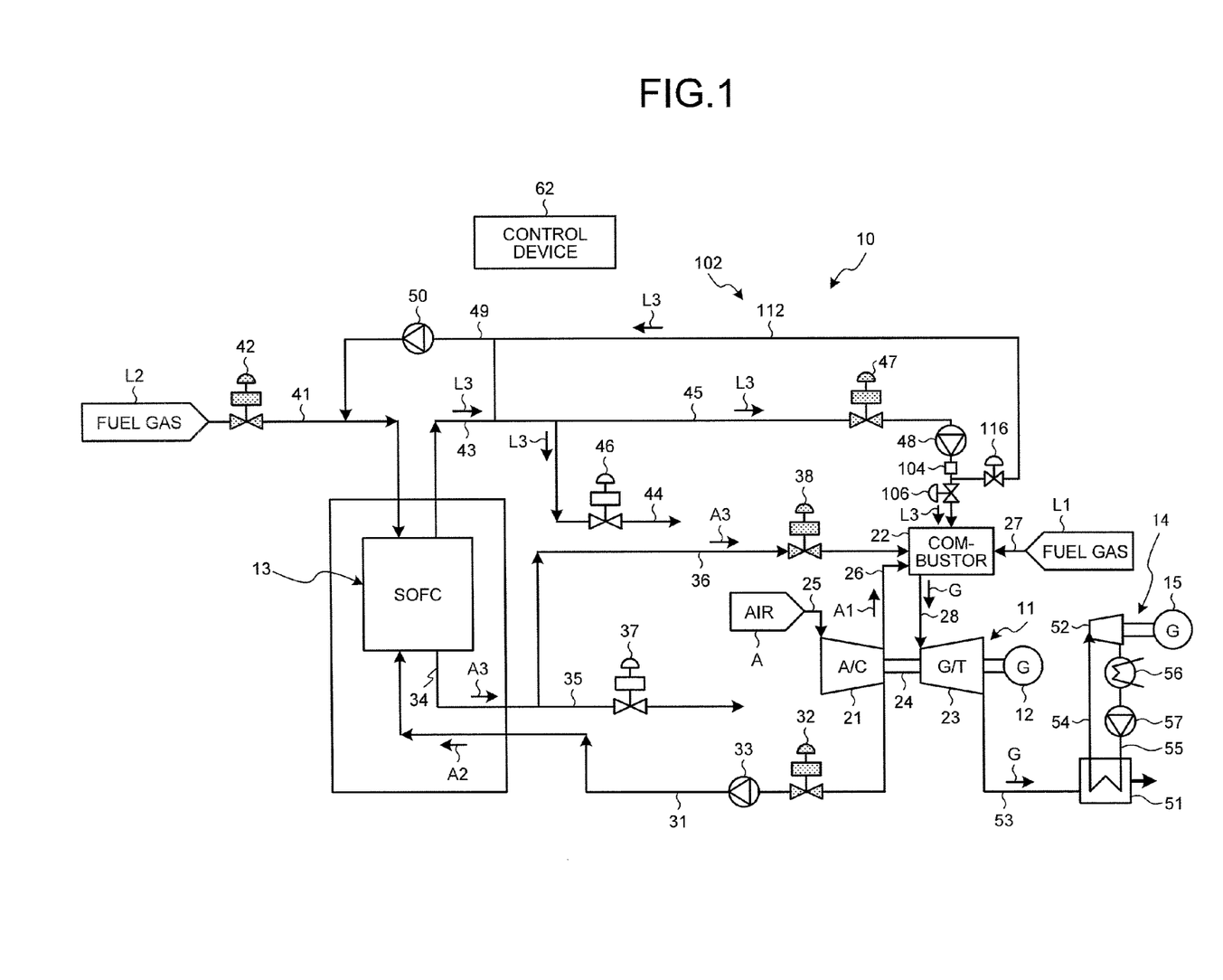
FIG. 1 is a schematic configuration diagram illustrating a power generation system of an embodiment.
Figure 2:
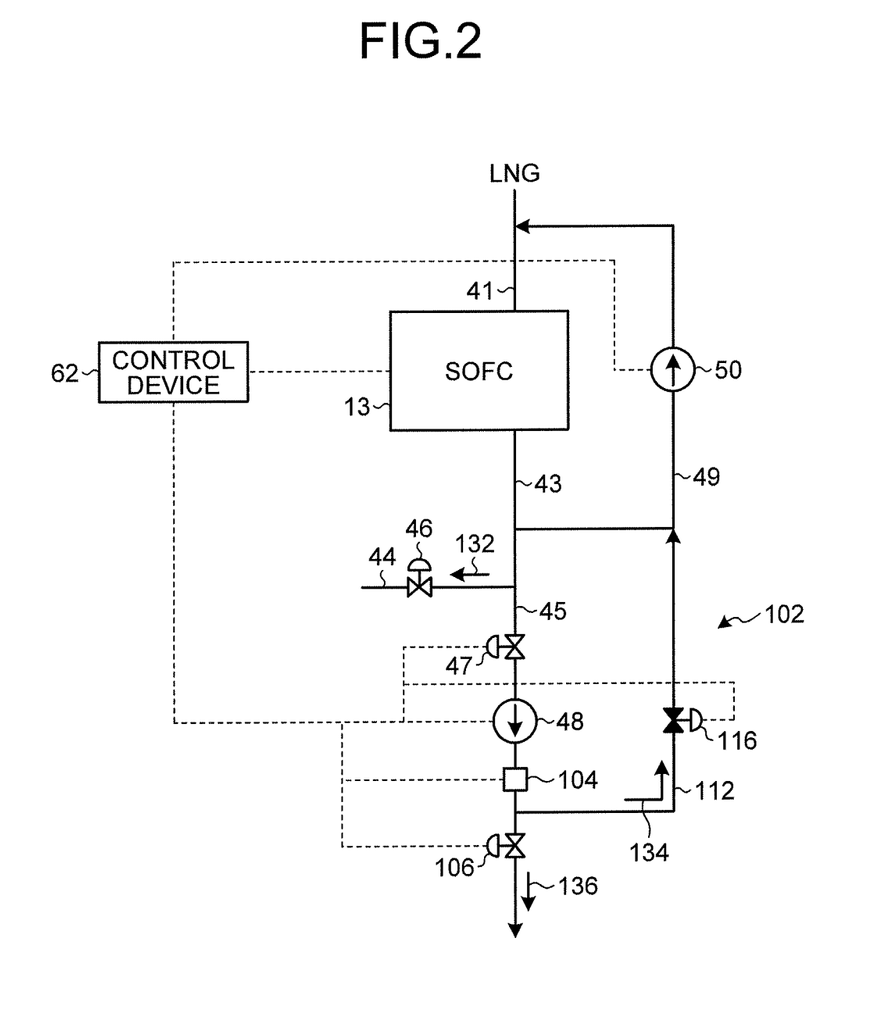
FIG. 2 is a schematic diagram of a fuel gas supply line of a power generation system according to an embodiment of the present invention.

FIG. 1 is a schematic configuration diagram illustrating the power generation system of the embodiment. FIG. 2 is a schematic diagram of a fuel gas supply line of a power generation system according to an embodiment of the present invention. In the embodiment, as illustrated in FIG. 1, a power generation system 10 includes a gas turbine 11, a power generator 12, an SOFC 13, a steam turbine 14, and a power generator 15. The power generation system 10 is configured to obtain high power generation efficiency by combining power generation by the gas turbine 11, power generation by the SOFC 13, and power generation by the steam turbine 14. The power generation system 10 further includes a control device 62. The control device 62 controls operation of each component of the power generation system 10 based on input settings, input instructions, results detected by a detection unit, and so on.

The gas turbine 11 includes a compressor 21, a combustor 22, and a turbine 23. The compressor 21 and the turbine 23 are connected together by a rotating shaft 24 so as to be able to rotate together. The compressor 21 compresses air A taken in from an air intake line 25. The combustor 22 mixes and combusts compressed air A1 supplied from the compressor 21 through a first compressed air supply line 26 and fuel gas L1 supplied from a first fuel gas supply line 27. The turbine 23 is rotated by flue gas (combustion gas) G supplied from the combustor 22 through a flue gas supply line 28. Although not illustrated in the drawings, the turbine 23 is supplied with the compressed air A1 compressed by the compressor 21 through a casing, and blades and so on are cooled by the compressed air A1 used as cooling air. The power generator 12 is mounted on the same shaft as that of the turbine 23, and when the turbine 23 rotates, the power generator 12 can generate power. Here, as the fuel gas L1 supplied to the combustor 22, for example, liquefied natural gas (LNG) is used.

The SOFC 13 reacts at a predetermined operating temperature and generates power by being supplied with high temperature fuel gas used as a reductant and high temperature air (oxidizing gas) used as an oxidant. The SOFC 13 is configured by a cathode, a solid electrolyte, and an anode, which are housed in a pressure container. The power is generated when some compressed air A2 compressed by the compressor 21 is supplied to the cathode and the fuel gas is supplied to the anode. Here, as fuel gas L2 supplied to the SOFC 13, for example, liquefied natural gas (LNG), hydrogen ($H_2$), carbon monoxide (CO), hydrocarbon gas such as methane ($CH_4$), and a gas manufactured by a gasification facility of carbonaceous raw material such as coal are used. The oxidizing gas supplied to the SOFC 13 is a gas containing approximately 15% to 30% of oxygen, and air is typically preferable as the oxidizing gas. However, besides air, a mixed gas of combustion flue gas and air, a mixed gas of oxygen and air, and so on can be used as the oxidizing gas (hereinafter, the oxidizing gas supplied to the SOFC 13 is referred to as air).

The SOFC 13 is connected with a second compressed air supply line 31 branched from the first compressed air supply line 26, and the some compressed air A2 compressed by the compressor 21 can be supplied to an introduction portion of the cathode. In the second compressed air supply line 31, a control valve 32 that can adjust the amount of air to be supplied and a blower (pressure increasing device) 33 that can increase the pressure of the compressed air A2 are provided along an air flow direction. The control valve 32 is provided on the upstream side in the air flow direction in the second compressed air supply line 31, and the blower 33 is provided on the downstream side of the control valve 32. The SOFC 13 is connected with an exhausted air line 34 that exhausts exhausted air A3 used at the cathode. The exhausted air line 34 branches into a flue line 35 that exhausts the exhausted air A3 used at the cathode to the outside and a compressed air circulation line 36 connected to the combustor 22. The flue line 35 is provided with a control valve 37 that can adjust the amount of air to be exhausted, and the compressed air circulation line 36 is provided with a control valve 38 that can adjust the amount of air to be circulated.

The SOFC 13 is provided with a second fuel gas supply line 41 that supplies the fuel gas L2 to an introduction portion of the anode. The second fuel gas supply line 41 is provided with a control valve 42 that can adjust the amount of fuel gas to be supplied. The SOFC 13 is connected with an exhausted fuel line 43 that exhausts exhausted fuel gas L3 used at the anode. The exhausted fuel line 43 branches into a flue line 44 that exhausts the exhausted fuel gas L3 to the outside and an exhausted fuel gas supply line 45 connected to the combustor 22. The flue line 44 is provided with a control valve 46 that can adjust the amount of fuel gas to be exhausted. In the exhausted fuel gas supply line 45, a control valve 47 that can adjust the amount of fuel gas to be supplied and a blower 48 that can increase the pressure of fuel are provided along a flow direction of the fuel gas L3. The control valve 47 is provided on the upstream side in the flow direction of the exhausted fuel gas L3 in the exhausted fuel gas supply line 45, and the blower 48 is provided on the downstream side of the control valve 47.

The SOFC 13 is provided with a fuel gas recirculation line 49 that connects the exhausted fuel line 43 with the second fuel gas supply line 41. The fuel gas recirculation line 49 is provided with a recirculation line blower 50 that recirculates the exhausted fuel gas L3 in the exhausted fuel line 43 to the second fuel gas supply line 41.

The steam turbine 14 rotates a turbine 52 by steam generated by a heat recovery steam generator (HRSG) 51. The heat recovery steam generator 51 is connected with a flue gas line 53 from the gas turbine 11 (turbine 23) and generates steam S by exchanging heat between air and high-temperature flue gas G. The steam turbine 14 (turbine 52) is provided with a steam supply line 54 and a water supply line 55 between the steam turbine 14 and the heat recovery steam generator 51. The water supply line 55 is provided with a steam condenser 56 and a water supply pump 57. The power generator 15 is mounted on the same shaft as that of the turbine 52, and when the turbine 52 rotates, the power generator 15 can generate power. The flue gas G whose heat is recovered by the heat recovery steam generator 51 is discharged to the atmosphere after harmful substances are removed from the flue gas G.

Here, the operation of the power generation system 10 of the embodiment will be described. When the power generation system 10 is started, the gas turbine 11, the steam turbine 14, and the SOFC 13 are started sequentially in this order.

First, in the gas turbine 11, the compressor 21 compresses the air A, the combustor 22 mixes and combusts the compressed air A1 and the fuel gas L1, and the turbine 23 is rotated by the flue gas G, so that the power generator 12 starts power generation. Subsequently, in the steam turbine 14, the turbine 52 is rotated by the steam S generated by the heat recovery steam generator 51, and thereby the power generator 15 starts power generation.

Subsequently, in the SOFC 13, first, the compressed air A2 is supplied, pressure increase is started, and heating is started. The control valve 37 of the flue line 35 and the control valve 38 of the compressed air circulation line 36 are closed, and the control valve 32 is opened at a predetermined degree of opening in a state in which the blower 33 of the second compressed air supply line 31 is stopped. Then some compressed air A2 compressed by the compressor 21 is supplied to the SOFC 13 from the second compressed air supply line 31. Thereby, the compressed air A2 is supplied to the SOFC 13, so that the pressure in the SOFC 13 is increased.

On the other hand, in the SOFC 13, pressurization is started by supplying the fuel gas L2 to the anode. The control valve 46 of the flue line 44 and the control valve 47 of the exhausted fuel gas supply line 45 are closed, and in a state in which the blower 48 is stopped, the control valve 42 of the second fuel gas supply line 41 is opened and the recirculation line blower 50 of the fuel gas recirculation line 49 is driven. Then, the fuel gas L2 is supplied from the second fuel gas supply line 41 to the SOFC 13 and the exhausted fuel gas L3 is recirculated by the fuel gas recirculation line 49. Thereby, the fuel gas L2 is supplied to the SOFC 13, so that the pressure in the SOFC is increased.

When the pressure in the SOFC 13 on the cathode side becomes the outlet pressure of the compressor 21, the control valve 32 is fully opened and the blower 33 is driven. At the same time, the control valve 37 is opened and the exhausted air A3 from the SOFC 13 is exhausted from the flue line 35. Then, the compressed air A2 is supplied to the SOFC 13 by the blower 33. At the same time, the control valve 46 is opened and the exhausted fuel gas L3 from the SOFC 13 is exhausted from the flue line 44. When the pressure on the cathode side and the pressure on the anode side in the SOFC 13 reach a target pressure, the pressure increase in the SOFC 13 is completed.

Thereafter, when the reaction (power generation) in the SOFC 13 is stabilized and components of the exhausted air A3 and the exhausted fuel gas L3 are stabilized, the control valve 37 is closed and the control valve 38 is opened. Then, the exhausted air A3 from the SOFC 13 is supplied to the combustor 22 from the compressed air circulation line 36. Further, the control valve 46 is closed, the control valve 47 is opened, and the blower 48 is driven. Then, the exhausted fuel gas L3 from the SOFC 13 is supplied to the combustor 22 from the exhausted fuel gas supply line 45. At this time, the amount of the fuel gas L1 supplied from the first fuel gas supply line 27 to the combustor 22 is reduced.

Here, all of the power generation by the power generator 12 by driving the gas turbine 11, the power generation by the SOFC 13, and the power generation by the power generator 15 by driving the steam turbine 14 are performed, so that the power generation system 10 becomes in a normal operating state.

By the way, in a general power generation system, when the control valve 47 is opened and the blower 48 is driven, the exhausted fuel gas L3 from the SOFC 13 is supplied from the exhausted fuel gas supply line 45 to the combustor 22. Here, if the temperature of the exhausted fuel gas supply line 45 is low, the temperature of the exhausted fuel gas L3 supplied to the gas turbine 11 through the exhausted fuel gas supply line 45 lowers. If the temperature of the exhausted fuel gas L3 lowers, there is a risk that drain occurs and a combustion calorific value (calories) of the exhausted fuel gas L3 varies.

Therefore, the power generation system 10 of the embodiment includes a heating means 102 that heats the exhausted fuel gas supply line 45, a detection unit 104 that detects a state of the exhausted fuel gas L3 flowing through the exhausted fuel gas supply line 45, and an on-off valve (on-off control valve) 106 arranged at a position (in the embodiment, on the downstream side of the control valve 47) close to the gas turbine 11 in the exhausted fuel gas supply line 45. When the control device (control unit) 62 of the power generation system 10 starts supplying the exhausted fuel gas L3 to the exhausted fuel gas supply line 45, that is, after the control device 62 opens the control valve 47, the control device 62 drives the heating means 102 and the on-off valve 106 on the basis of a result of the detection unit 104.

In other words, the heating means 102 for heating the exhausted fuel gas supply line 45 is provided, and the heating by the heating means 102 is controlled based on a detection result of the detection unit 104. Further, the open/close of the on-off valve 106 is controlled based on the detection result of the detection unit 104, so that the supply/stop of the exhausted fuel gas L3 to the gas turbine 11 (combustor 22) is controlled. Then, the exhausted fuel gas supply line 45 can be heated, and further, after the exhausted fuel gas supply line 45 is heated, the exhausted fuel gas L3 that has been passed through the exhausted fuel gas supply line 45 can be supplied to the gas turbine 11. Thereby, the combustion calorific value (calories) of the exhausted fuel gas L3 to be supplied to the gas turbine 11 (combustor 22) can be stabilized.

More specifically, as illustrated in FIG. 2, the heating means 102 includes an exhausted fuel gas recirculation line 112 and a control valve 116. One end of the exhausted fuel gas recirculation line 112 is connected between the blower 48 of the exhausted fuel gas supply line 45 and the combustor 22, and the other end is connected to the fuel gas recirculation line 49. The exhausted fuel gas recirculation line 112 supplies the exhausted fuel gas L3 supplied from the exhausted fuel gas supply line 45 to the fuel gas recirculation line 49. The control valve 116 is placed in the exhausted fuel gas recirculation line 112. The control valve 116 switches whether or not the exhausted fuel gas L3 flows through the exhausted fuel gas recirculation line 112, by switching open/close and adjusts the flow rate of the exhausted fuel gas L3 flowing through the exhausted fuel gas recirculation line 112 by adjusting the degree of opening.

The detection unit 104 is arranged on the downstream side of the blower 48 of the exhausted fuel gas supply line 45 and on the upstream side of a position where the exhausted fuel gas supply line 45 connects with the exhausted fuel gas recirculation line 112. The detection unit 104 is a detection device that detects the calories of the exhausted fuel gas flowing through the exhausted fuel gas supply line 45 at a position where the detection unit 104 is placed. The detection unit 104 may be a device that can detects a state of the exhausted fuel gas L3 flowing through the exhausted fuel gas supply line 45 at a position where the detection unit 104 is placed. For example, a temperature detection device that detects the temperature of the exhausted fuel gas L3 can be used as the detection unit 104. Here, the state of the exhausted fuel gas L3 is various conditions by which it is possible to determine whether or not drain occurs in the exhausted fuel gas L3 while the exhausted fuel gas L3 is flowing through the exhausted fuel gas supply line 45. It is preferable that the detection unit 104 is arranged at a position close to the gas turbine 11 on the exhausted fuel gas supply line 45, that, is, a position close to the position where the exhausted fuel gas supply line 45 connects with the exhausted fuel gas recirculation line 112. Thereby, when the exhausted fuel gas L3 flows through the exhausted fuel gas supply line 45, it is possible to detect changes occurring in the exhausted fuel gas L3 with higher probability.

The on-off valve 106 is arranged on the downstream side of the position where the exhausted fuel gas supply line 45 connects with the exhausted fuel gas recirculation line 112 and on the upstream side of the combustor 22. The on-off valve 106 can switch whether or not to supply the exhausted fuel gas L3 to the combustor 22 by switching open/close.

The control device 62 can adjust at least the open/close of the on-off valve 106. Therefore, the control device 62 can switch whether or not to supply the exhausted fuel gas L3 flowing through the exhausted fuel gas supply line 45 to the gas turbine 11. Further, the control device 62 of the embodiment can adjust the open/close and the degree of opening of the control valves 46, 47, and 116. Therefore, the control device 62 can switch the flow of the exhausted fuel gas L3 flowing through the exhausted fuel line 43, that is, can switch an apparatus to which the exhausted fuel is supplied.

Figure 3:
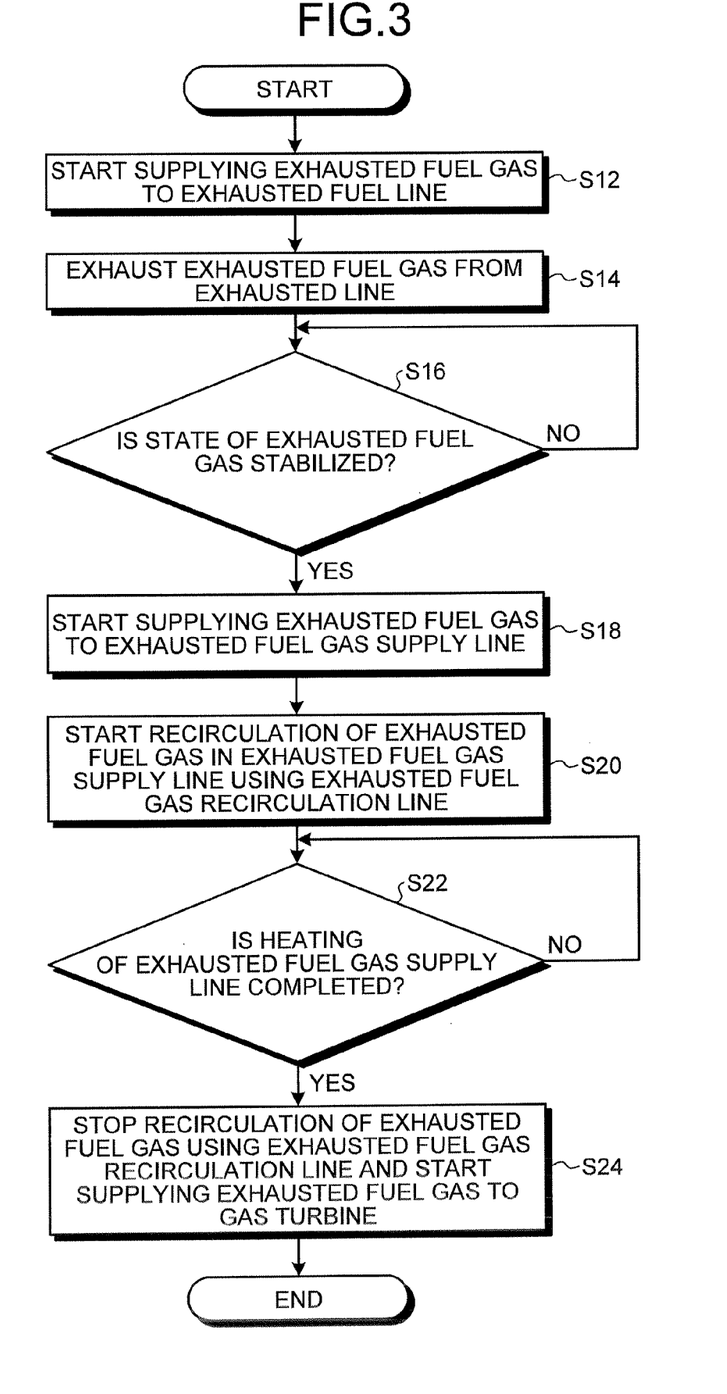
FIG. 3 is a flowchart illustrating an example of a driving operation of the power generation system of the embodiment.
Figure 4:
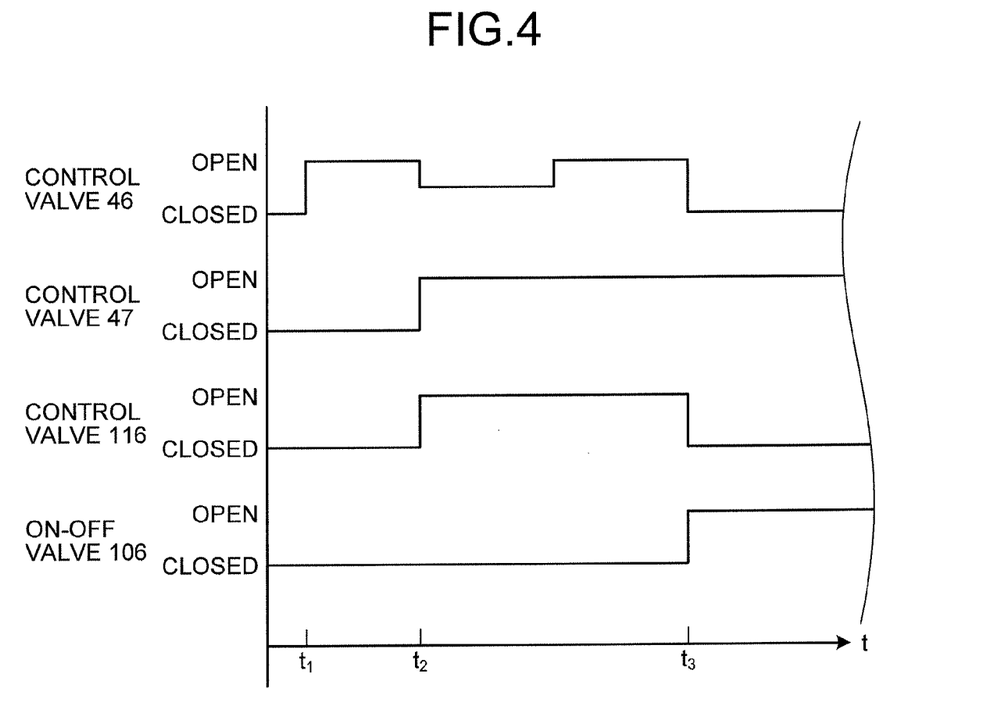
FIG. 4 is a time chart illustrating timing of an operation of valves that control a flow of exhausted fuel gas of the power generation system of the embodiment.

Hereinafter, a driving method of the power generation system 10 of the embodiment described above will be described with reference to FIGS. 2 to 4. FIG. 3 is a flowchart illustrating an example of a driving operation of the power generation system of the embodiment. FIG. 4 is a time chart illustrating timing of an operation of valves that control a flow of the exhausted fuel gas of the power generation system of the embodiment. The driving operation illustrated in FIG. 3 can be realized when the control device (control unit) 62 performs arithmetic processing based on detection results of each unit. Further, even when the power generation system 10 performs the processing illustrated in FIG. 3, the power generation system 10 performs in parallel the circulation of the exhausted fuel gas by using the fuel gas recirculation line 49.

First, after the control device 62 starts supplying the exhausted fuel gas L3 to the exhausted fuel line 43 (step S12), the control device 62 exhausts the exhausted fuel gas L3 from the flue line 44 (step S14). Specifically, as illustrated at the time t1 in FIG. 4, the control device 62 opens the control valve 46, closes the control valve 47, closes the control valve 116, and closes the on-off valve 106. Thereby, the exhausted fuel gas L3 flows in a direction indicated by an arrow 132 illustrated in FIG. 2, and the exhausted fuel gas L3 is exhausted from the flue line 44.

The control device 62 determines whether or not the state of the exhausted fuel gas L3 is stabilized (step S16). Specifically, the control device 62 determines whether or not the components of the exhausted fuel gas L3 flowing through the exhausted fuel line 43 are stabilized. For example, the control device 62 performs components analysis of the exhausted fuel gas L3 and performs the determination based on a result of the components analysis.

When the control device 62 determines that the state of the exhausted fuel gas L3 is not stabilized (No in step S16), the control device 62 returns to step S16 and performs the determination of step S16 again. The control device 62 repeatedly performs the processing of step S16 while exhausting the exhausted fuel gas L3 from the flue line 44 until the state of the exhausted fuel gas L3 flowing through the exhausted fuel line 43 is stabilized.

When the control device 62 determines that the state of the exhausted fuel gas L3 is stabilized (Yes in step S16), the control device 62 starts supplying the exhausted fuel gas L3 to the exhausted fuel gas supply line 45 (step S18) and starts recirculation of the exhausted fuel gas L3 in the exhausted fuel gas supply line 45 by using the exhausted fuel gas recirculation line 112 (step S20). Specifically, as illustrated at the time t2 in FIG. 4, the control device 62 reduces the degree of opening of the control valve 46 and switches the control valve 47 from closed to open. Thereby, the exhausted fuel gas L3 flowing through the exhausted fuel line 43 can be supplied to the exhausted fuel gas supply line 45. Further, the control device 62 switches the control valve 116 from closed to open and maintains the on-off valve 106 in the closed state. After the control device 62 opens the control valve 47 and starts supplying the exhausted fuel gas L3 to the exhausted fuel gas supply line 45, the control device 62 drives the blower 48. The blower 48 sends the exhausted fuel gas L3 flowing through the exhausted fuel gas supply line 45 to a connection portion between the exhausted fuel gas supply line 45 and the exhausted fuel gas recirculation line 112. The on-off valve 106 is closed and the control valve 116 is opened, so that when the exhausted fuel gas L3 flowing through the exhausted fuel gas supply line 45 reaches the connection portion between the exhausted fuel gas supply line 45 and the exhausted fuel gas recirculation line 112, the exhausted fuel gas L3 flows into the exhausted fuel gas recirculation line 112. Thereby, the exhausted fuel gas L3 that has flown through the exhausted fuel gas supply line 45 flows in a direction indicated by an arrow 134 illustrated in FIG. 2, flows in the exhausted fuel gas recirculation line 112, and is supplied to the fuel gas recirculation line 49. The exhausted fuel gas L3 supplied to the fuel gas recirculation line 49 is mixed with other exhausted fuels and other fuels, and is supplied to the SOFC 13 again. The control device 62 circulates the exhausted fuel gas through the exhausted fuel gas supply line 45, the exhausted fuel gas recirculation line 112, the fuel gas recirculation line 49, and the SOFC 13 in this order, so that the control device 62 can heat the exhausted fuel gas supply line 45 by the exhausted fuel gas L3. Further, it is possible to heat the exhausted fuel gas supply line 45 again by inputting the exhausted fuel gas L3 used for heating into the SOFC 13.

After the control device 62 starts the recirculation of the exhausted fuel gas L3, the control device 62 determines whether or not the heating of the exhausted fuel gas supply line 45 is completed (step S22). The control device 62 determines whether or not the heating of the exhausted fuel gas supply line 45 is completed based on the detection result of the detection unit 104. The control device 62 determines whether or not the heating of the exhausted fuel gas supply line 45 by the heating means 102 is completed based on the state of the exhausted fuel gas L3 flowing through the exhausted fuel gas supply line 45, which is detected by the detection unit 104. Specifically, the detection unit 104 can measure the calories and the temperatures of the exhausted fuel gas L3 as the state of the exhausted fuel gas L3. When the control device 62 determines that no drain is detected in the exhausted fuel gas L3 flowing through the exhausted fuel gas supply line 45 based on the state of the exhausted fuel gas L3, the control device 62 determines that the heating of the exhausted fuel gas supply line 45 is completed. When the control device 62 detects the temperature by using the detection unit 104, the control device 62 determines that the heating is completed when the temperature becomes higher than or equal to a predetermined value. When the control device 62 detects the calories of the exhausted fuel gas L3 by using the detection unit 104, the control device 62 determines that the heating is completed when the calories become within a predetermined range.

When the control device 62 determines that the heating is not completed (No in step S22), the control device 62 returns to step S22 and performs the determination of step S22 again. The control device 62 repeatedly performs the processing of step S22 while continuing the recirculation of the exhausted fuel gas L3 by using the exhausted fuel gas recirculation line 112 until the heating of the exhausted fuel gas supply line 45 is completed, that is, until the state of the exhausted fuel gas L3 detected by the detection unit 104 is stabilized. Thereby, the control device 62 can heat the exhausted fuel gas supply line 45 in a state in which the exhausted fuel gas L3 is not supplied from the exhausted fuel gas supply line 45 to the gas turbine 11. After the control device 62 starts the recirculation of the exhausted fuel gas L3, the control device 62 adjusts the degree of opening of the control valve 46 based on the state of the exhausted fuel gas L3 (for example, the temperature of the exhausted fuel gas detected by the detection unit 104). Specifically, when the exhausted fuel gas L3 flows into the exhausted fuel gas supply line 45 and the pressure in the exhausted fuel gas supply line 45 is increased, the control device 62 increases the degree of opening of the control valve 46. Thereby, surplus exhausted fuel gas L3 of the exhausted fuel gas L3 supplied from the exhausted fuel line 43 can be exhausted from the flue line 44.

When the control device 62 determines that the heating is completed (Yes in step S22), the control device 62 stops the recirculation of the exhausted fuel gas L3 using the exhausted fuel gas recirculation line 112 and starts supplying the exhausted fuel gas L3 to the gas turbine 11 (step S24). Specifically, as illustrated at the time t3 in FIG. 4, the control device 62 switches the control valve 46 from open to closed, maintains the control valve 47 in the open state, switches the control valve 116 from open to closed, and switches the on-off valve 106 from closed to open. Thereby, a supply destination of the exhausted fuel gas L3 flowing through the exhausted fuel gas supply line 45 is switched from the exhausted fuel gas recirculation line 112 to the combustor 22 beyond the on-off valve 106, and the exhausted fuel gas L3 is supplied in a direction indicated by an arrow 136 illustrated in FIG. 2. After the control device 62 starts supplying the exhausted fuel gas L3 to the combustor 22, the control device 62 ends the process.

In this way, the power generation system 10 of the embodiment heats the exhausted fuel gas supply line 45 by using the heating means 102 and starts supplying the exhausted fuel gas L3 to the gas turbine 11 after the heating of the exhausted fuel gas supply line 45 is completed. Thereby, it is possible to prevent the exhausted fuel gas L3, which flows through the exhausted fuel gas supply line 45 that is in a low temperature state (normal temperature state) during starting-up of the operation and so on and whose temperature falls, from being supplied to the gas turbine 11.

Here, when the exhausted fuel gas L3 is cooled, drain occurs. A component configuration of the exhausted fuel gas L3 in the downstream portion of the exhausted fuel gas supply line 45 in which the drain occurs changes, and the amount of water in the exhausted fuel gas L3 decreases, so that the combustion calorific value (calories) of the exhausted fuel gas L3 increases. Further, in the power generation system 10, the exhausted fuel gas supply line 45 is heated by the exhausted fuel gas L3, so that the amount of generation of the drain gradually changes. Thereafter, if the drain generated in the exhausted fuel gas supply line 45 evaporates, the evaporated drain mixes in the exhausted fuel gas L3, and $H_2O$ of the exhausted fuel gas L3 increases. When $H_2O$ of the exhausted fuel gas L3 increases, the combustion calorific value (calories) of the exhausted fuel gas L3 decreases. Thereby, the combustion calorific value of the exhausted fuel gas L3 in the downstream portion of the exhausted fuel gas supply line 45 gradually changes. When such exhausted fuel gas L3 is supplied to the gas turbine 11, the control of the combustion in the gas turbine 11 becomes complicated. Further, it is not preferable to supply the exhausted fuel gas L3 in which drain occurs to the combustor 22 of the gas turbine 11. On the other hand, as described above, the power generation system 10 of the embodiment starts supplying the exhausted fuel gas L3 to the gas turbine 11 after the heating of the exhausted fuel gas supply line 45 is completed. Thereby, it is possible to suppress variation of the combustion calorific value of the exhausted fuel gas L3 to be supplied to the gas turbine 11. The components of the exhausted fuel gas L3 to be supplied can be stabilized, so that the combustion of the gas turbine 11 can be stabilized. Thereby, it is possible to simplify the control and to reduce adverse effects to the gas turbine 11.

The power generation system 10 of the embodiment has a configuration in which the exhausted fuel gas recirculation line 112 is provided as the heating means 102 and the exhausted fuel gas L3 is recirculated. The exhausted fuel gas L3 is used as a heating source, so that it is not necessary to use a new heating source. Therefore, the device configuration can be simplified. Further, the power generation system 10 includes the exhausted fuel gas recirculation line 112 and returns the exhausted fuel gas L3 to the SOFC 13 again, so that the power generation system 10 can supply the exhausted fuel gas L3 to the gas turbine 11 after reheating the exhausted fuel gas L3 and completing the heating of the exhausted fuel gas recirculation line 112. Thereby, it is possible to efficiently use the exhausted fuel gas L3.

Further, in the power generation system 10, the exhausted fuel gas recirculation line 112 is connected to the exhausted fuel gas supply line 45 at a position on the downstream side of the blower 48. Therefore, the blower 48 can be used as a driving source that supplies the exhausted fuel gas L3 to the exhausted fuel gas recirculation line 112. Thereby, it is possible to efficiently use one blower 48.

It is preferable that, in the power generation system 10, the on-off valve 106 is arranged close to the gas turbine 11 (combustor 22) in the exhausted fuel gas supply line 45. In other words, it is preferable for the power generation system 10 to shorten the distance between the on-off valve 106 and the combustor 22. Thereby, when the on-off valve 106 is opened and the supply of the exhausted fuel gas L3 to the gas turbine 11 is started, it is possible to shorten a range of the exhausted fuel gas supply line 45, which is heated by the exhausted fuel gas L3 supplied to the gas turbine 11. Thereby, when the supply of the exhausted fuel gas L3 to the gas turbine 11 is started, it is possible to suppress the generation of the drain in the exhausted fuel gas L3 in the exhausted fuel gas supply line 45 in a range on the downstream side of the on-off valve 106.

Further, the power generation system 10 of the embodiment includes the control valve 47 on the upstream side of the blower 48 and the detection unit 104 in the exhausted fuel gas supply line 45, so that power generation system 10 can switch whether or not to supply the exhausted fuel gas L3 to a range in which the blower 48 and the detection unit 104 are arranged in the exhausted fuel gas supply line 45. In FIG. 1, the position of the control valve 47 is arranged close to the combustor 22 in the exhausted fuel gas supply line 45. However, the arranged position is not particularly limited, but may be any position on the downstream side of the connection portion between the exhausted fuel gas supply line 45 and the flue line 44 and on the upstream side of the connection portion between the exhausted fuel gas supply line 45 and the exhausted fuel gas recirculation line 112. The power generation system 10 not necessarily has to include the control valve 47.

The power generation system 10 may use another heating method as the heating means. For example, the exhausted fuel gas recirculation line 112 may be heated by using steam exhausted from another device, such as, for example, steam generated by the heat recovery steam generator (HRSG) 51, or the exhausted fuel gas recirculation line 112 may be heated by winding an electric heating wire around the exhausted fuel gas recirculation line 112 and causing the electric heating wire to generate heat by flowing an electric current through the electric heating wire.

Although the on-off valve 106 may be able to at least switch open and closed, the on-off valve 106 may be a control valve that adjusts the degree of opening. The control valve 47 may be able to at least switch open and closed, and the control valve 47 may be a control valve. In the same manner, it is preferable that at least either one of the control valve 47 and the on-off valve 106 provided in the exhausted fuel gas supply line 45 is a control valve that can adjust the degree of opening (the flow path resistance). Thereby, it is possible to adjust the amount of the exhausted fuel gas L3 to be supplied to the combustor 22.

REFERENCE SIGNS LIST

10 POWER GENERATION SYSTEM
11 GAS TURBINE
12 POWER GENERATOR
13 SOLID OXIDE FUEL CELL (SOFC)
14 STEAM TURBINE
15 POWER GENERATOR
21 COMPRESSOR
22 COMBUSTOR
23 TURBINE

26 FIRST COMPRESSED AIR SUPPLY LINE
27 FIRST FUEL GAS SUPPLY LINE
31 SECOND COMPRESSED AIR SUPPLY LINE
32 CONTROL VALVE (FIRST ON-OFF VALVE)
33, 48 BLOWER
34 EXHAUSTED AIR LINE
36 COMPRESSED AIR CIRCULATION LINE
41 SECOND FUEL GAS SUPPLY LINE
42 CONTROL VALVE
43 EXHAUSTED FUEL LINE
45 EXHAUSTED FUEL GAS SUPPLY LINE
47 CONTROL VALVE
49 FUEL GAS RECIRCULATION LINE
62 CONTROL DEVICE (CONTROL UNIT)
102 HEATING MEANS
104 DETECTION UNIT
106 ON-OFF VALVE
112 EXHAUSTED FUEL GAS RECIRCULATION LINE
116 CONTROL VALVE

The invention claimed is:

1. A power generation system comprising:
a gas turbine including a compressor and a combustor;
a fuel cell including a cathode and an anode;
an exhausted fuel gas supply line that supplies exhausted fuel gas exhausted from the fuel cell to the gas turbine;
an on-off control valve which is arranged in the exhausted fuel gas supply line and which at least switches between open and close;
a heating unit that heats the exhausted fuel gas supply line in a range on an upstream side of the on-off control valve;
a calorimeter that detects calories of the exhausted fuel gas in the exhausted fuel gas supply line in the range on the upstream side of the on-off control valve; and
a control unit which controls the heating of the exhausted fuel gas supply line by the heating unit based on a result detected by the calorimeter, and which operates the on-off control valve to open when determining that the heating of the exhausted fuel gas supply line is completed based on a result detected by the calorimeter,
wherein, when the control unit detects that the calories detected by the calorimeter are within a predetermined range, the control unit determines that the heating of the exhausted fuel gas supply line is completed.

2. A power generation system comprising:
a gas turbine including a compressor and a combustor;
a fuel cell including a cathode and an anode;
an exhausted fuel gas supply line that supplies exhausted fuel gas exhausted from the fuel cell to the gas turbine;
an on-off control valve which is arranged in the exhausted fuel gas supply line and which at least switches between open and close;
a heating unit that heats the exhausted fuel gas supply line in a range on an upstream side of the on-off control valve;
a detection unit that detects a state of the exhausted fuel gas in the exhausted fuel gas supply line in the range on the upstream side of the on-off control valve;
a control unit which controls the heating of the exhausted fuel gas supply line by the heating unit based on a result detected by the detection unit, and which operates the on-off control valve to open when determining that the heating of the exhausted fuel gas supply line is completed based on a result detected by the detection unit;
a fuel gas supply line that supplies fuel gas to the fuel cell; and
a fuel gas recirculation line that supplies a part of the exhausted fuel gas in the exhausted fuel gas supply line to the fuel gas supply line, a first end of the fuel gas recirculation line being connected to the exhausted fuel gas supply line on the upstream side of the on-off control valve, and a second end of the fuel gas recirculation line being connected to the fuel gas supply line,
wherein the heating unit includes an exhausted fuel gas recirculation line with a first end connected to the exhausted fuel gas supply line on a downstream side of a connection position between the exhausted fuel gas supply line and the fuel gas recirculation line and on the upstream side of the on-off control valve and a second end connected to the fuel gas recirculation line, supplies the exhausted fuel gas in the exhausted fuel gas supply line to the fuel gas recirculation line by the exhausted fuel gas recirculation line, circulates the exhausted fuel gas in the exhausted fuel gas supply line, and heats the exhausted fuel gas supply line by heat of the exhausted fuel gas.

3. An operation method of a power generation system including a gas turbine including a compressor and a combustor, a fuel cell including a cathode and an anode, an exhausted fuel gas supply line that supplies exhausted fuel gas exhausted from the fuel cell to the gas turbine, and an on-off control valve which is arranged in the exhausted fuel gas supply line and which at least switches between open and close, the operation method comprising:
detecting calories of the exhausted fuel gas in the exhausted fuel gas supply line, by a calorimeter, in a range on an upstream side of the on-off control valve;
heating the exhausted fuel gas supply line based on a result detected by the calorimeter; and
setting the on-off control valve to open when determining that a state of the exhausted fuel gas in the exhausted fuel gas supply line is stabilized based on a result detected by the calorimeter.

4. The power generation system according to claim 2, wherein:
the detection unit is a thermometer that detects a temperature of the exhausted fuel gas, and
when the control unit detects that the temperature detected by the detection unit is higher than or equal to a predetermined value, the control unit determines that the heating of the exhausted fuel gas supply line is completed.

5. An operation method of a power generation system including a gas turbine including a compressor and a combustor, a fuel cell including a cathode and an anode, an exhausted fuel gas supply line that supplies exhausted fuel gas exhausted from the fuel cell to the gas turbine, an on-off control valve which is arranged in the exhausted fuel gas supply line and which at least switches between open and close, a fuel gas supply line connected to the fuel cell, a fuel gas recirculation line connected to the fuel gas supply line, a first end of the fuel gas recirculation line being connected to the exhausted fuel gas supply line on an upstream side of the on-off control valve, and a second end of the fuel gas recirculation line being connected to the fuel gas supply line, and a heating unit including an exhausted fuel gas recirculation line with a first end connected to the exhausted fuel gas supply line on a downstream side of a connection position between the exhausted fuel gas supply line and the fuel gas recirculation line and on the upstream side of the on-off control valve and a second end connected to the fuel gas recirculation line, the operation method comprising:

detecting a state of the exhausted fuel gas in the exhausted fuel gas supply line in a range on the upstream side of the on-off control valve;

heating the exhausted fuel gas supply line based on a result detected by a detection unit;

setting the on-off control valve to open when determining that a state of the exhausted fuel gas in the exhausted fuel gas supply line is stabilized based on a result detected by the detection unit;

supplying fuel gas to the fuel cell;

supplying a part of the exhausted fuel gas in the exhausted fuel gas supply line to the fuel gas supply line;

supplying the exhausted fuel gas in the exhausted fuel gas supply line to the fuel gas recirculation line by the exhausted fuel gas recirculation line;

circulating the exhausted fuel gas in the exhausted fuel gas supply line; and heating the exhausted fuel gas supply line by heat of the exhausted fuel gas.

6. The operation method according to claim 5, wherein:

the detection unit is a thermometer that detects a temperature of the exhausted fuel gas, and when the control unit detects that the temperature detected by the detection unit is higher than or equal to a predetermined value, the control unit determines that the heating of the exhausted fuel gas supply line is stabilized.

* * * * *